(No Model.)
A. J. CLARK.
COFFEE MILL MOTOR.
No. 297,065. Patented Apr. 15, 1884.
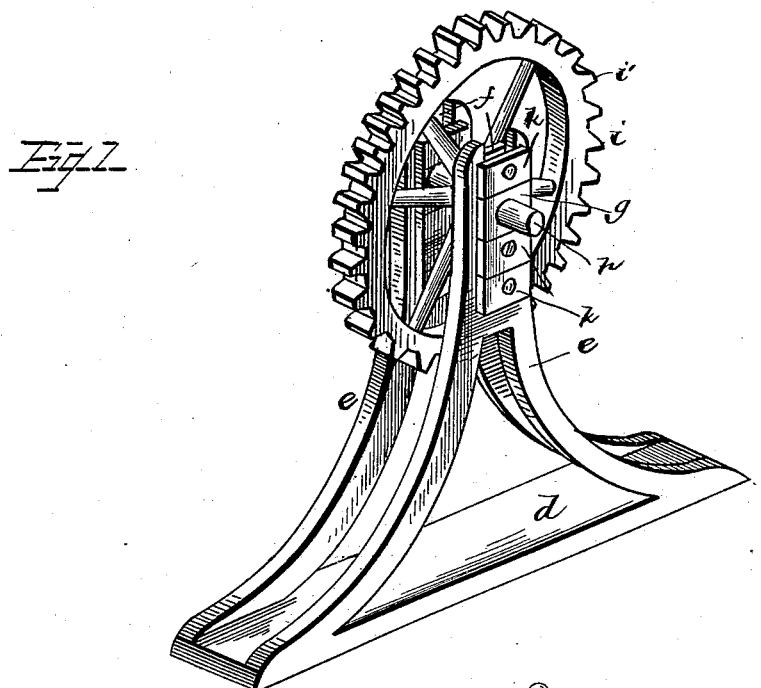

UNITED STATES PATENT OFFICE.

ALBERT JUDSON CLARK, OF CARBONDALE, ASSIGNOR OF ONE-HALF TO JUDSON D. AYLSWORTH, OF SCRANTON, PENNSYLVANIA.

COFFEE-MILL MOTOR.

SPECIFICATION forming part of Letters Patent No. 297,065, dated April 15, 1884.

Application filed February 29, 1884. (No model.)

*To all whom it may concern:*

Be it known that I, ALBERT J. CLARK, a citizen of the United States, residing at Carbondale, in the county of Lackawanna and State of Pennsylvania, have invented a new and useful Coffee-Mill Motor, of which the following is a specification, reference being had to the accompanying drawings.

This invention has relation to motors for increasing the speed of a grocer's coffee-mill or spice-mill; and it consists in the construction and novel arrangement of parts, as will be hereinafter fully described, and particularly pointed out in the claims appended.

Figure 1 is a view in perspective of the improved motor detached from the coffee or spice mill; and Fig. 2 is a side elevation, showing the motor geared to the coffee or spice mill.

Referring by letter to the accompanying drawings, $a$ designates a coffee or spice mill constructed as such mills are commonly found in grocers' stores and tea and coffee stores, with this exception that the fly-wheel to which the handle is applied in such mills is removed, and its place supplied by a pinion, $b$, on that end of the shaft, the fly-wheel $c$ still remaining in position on the other end of the shaft of the mill.

My improvement consists in adding this pinion $b$ to the shaft of the mill and in providing a base, $d$, from which rise the standards $e\ e$, bifurcated for the greater portion of their length, said bifurcations opening out at the tops of the standards. These bifurcations $ff$ are provided for the reception of adjustable bearing-blocks $g\ g$, upon which the shaft $h$ of the combined fly-wheel and gear-wheel $i$ bears, and by adjusting which the gear part $i'$ of the wheel $i$ may be adjusted vertically either up or down to suit mills of different sizes.

Split securing-blocks $k\ k$ are provided in the bifurcations above the shaft $h$ in place in its bearings, nuts and bolts being employed to secure these blocks in place in their ways.

The combined fly and gear wheel $i$ is provided with a handle, $l$, by which motion is imparted to the motor.

As above described, the motor is applicable to all old mills by removing the hand fly-wheel and applying the pinion $b$.

In the manufacture of new mills the motor may be made a part of them by casting the bifurcated uprights with body of the mill as a part of the same. By using this motor the mill is driven at a highly-increased rate of speed over the old method of having both fly-wheels on the same shaft without intermediate gearing. By thus increasing the speed the capacity of the mill is increased about threefold, and it is run with less power of exertion as the leverage is increased.

The device is cheap, simple, and efficient for the purposes for which it is intended, and is applicable to all mills of this class.

Having thus fully described my invention, what I claim as new, and desire to secure by Letters Patent of the United States, is—

1. In a motor for coffee and spice mills, the combination, with the base provided with the bifurcated standards, of the combined fly and gear wheel having a suitable handle, and a fixed pinion on the end of the shaft of the mill-shaft, substantially as specified.

2. In a motor for coffee and spice mills, the combination, with the bifurcated standards on a suitable base, of the adjusting and securing blocks forming bearings in the bifurcations for the shaft of the combined fly and gear wheel, the combined fly and gear wheel provided with a handle, and an engaging-pinion on the mill-shaft, substantially as specified.

3. In a hand-mill, the combination, with the mill-frame provided with vertical standards at one end forming bearings for the shaft of the driving-wheel, of the pinion on the mill-shaft, and the combined fly and gear wheel provided with a suitable handle, substantially as specified.

In testimony that I claim the foregoing as my own I have hereto affixed my signature in presence of two witnesses.

ALBERT JUDSON CLARK.

Witnesses:
  P. S. JOSLIN,
  S. S. CLARK.